(12) United States Patent
Prucher

(10) Patent No.: US 9,124,144 B2
(45) Date of Patent: Sep. 1, 2015

(54) DUAL RADIAL GAP MOTOR-GENERATOR STRUCTURE

(76) Inventor: Bryan Prucher, Clarkston, MI (US)

( * ) Notice: Subject to any disclaimer, the term of this patent is extended or adjusted under 35 U.S.C. 154(b) by 426 days.

(21) Appl. No.: 13/567,502

(22) Filed: Aug. 6, 2012

(65) Prior Publication Data

US 2012/0299401 A1 Nov. 29, 2012

Related U.S. Application Data

(63) Continuation-in-part of application No. 12/469,143, filed on May 20, 2009, now Pat. No. 8,247,943.

(51) Int. Cl.
| | |
|---|---|
| H02K 5/00 | (2006.01) |
| H02K 47/00 | (2006.01) |
| H02K 16/00 | (2006.01) |
| H02K 1/22 | (2006.01) |
| H02K 9/00 | (2006.01) |
| H02K 3/47 | (2006.01) |
| H02K 7/08 | (2006.01) |
| H02K 16/02 | (2006.01) |
| H02K 3/32 | (2006.01) |

(52) U.S. Cl.
CPC .............. *H02K 9/005* (2013.01); *H02K 3/47* (2013.01); *H02K 7/083* (2013.01); *H02K 16/02* (2013.01); *H02K 3/325* (2013.01); *H02K 2203/03* (2013.01)

(58) Field of Classification Search
CPC ..................................................... H02K 16/02
USPC ................................... 310/91, 113, 114, 266
See application file for complete search history.

(56) References Cited

U.S. PATENT DOCUMENTS

| | | | |
|---|---|---|---|
| 4,130,769 A | 12/1978 | Karube | |
| 4,292,558 A | 9/1981 | Flick et al. | |
| 5,334,899 A | 8/1994 | Skybyk | |
| 5,874,796 A | 2/1999 | Petersen | |
| 6,590,312 B1 * | 7/2003 | Seguchi et al. | 310/266 |
| 6,946,760 B2 | 9/2005 | Crapo et al. | |
| 7,291,953 B1 | 11/2007 | Smith et al. | |
| 7,750,521 B2 | 7/2010 | Qu et al. | |
| 2001/0048262 A1 * | 12/2001 | Takano et al. | 310/179 |
| 2003/0205946 A1 * | 11/2003 | Maslov | 310/254 |
| 2004/0232800 A1 * | 11/2004 | Seguchi et al. | 310/266 |
| 2004/0239199 A1 | 12/2004 | Qu et al. | |
| 2005/0104469 A1 | 5/2005 | Zepp et al. | |
| 2006/0049712 A1 | 3/2006 | Zepp et al. | |
| 2006/0131985 A1 * | 6/2006 | Qu et al. | 310/266 |

FOREIGN PATENT DOCUMENTS

| | | | |
|---|---|---|---|
| JP | 2000253613 A | * | 9/2000 |
| JP | 2005051929 A | * | 2/2005 |

* cited by examiner

*Primary Examiner* — Jose Gonzalez Quinone
(74) *Attorney, Agent, or Firm* — The Weintraub Group, P.L.C.

(57) ABSTRACT

A radial gap motor/generator that may be air or liquid cooled. The motor/generator has a stator in radially spaced relation to at least one thin annular induction structure. The motor/generator has at least two spaced apart annular rings each having an inner surface and outer surface, the annular rings having a permanent magnet structure embedded between the inner surface and outer surface of the annular rings. The motor/generator has at least two spaced apart radial gaps, the first gap between the first annular ring and the induction structure and the second gap between the second annular ring and the induction structure, the stator being disposed between the gaps. The motor/generator may include multiple gaps and multiple annular induction structures to increase the overall power density of the system.

12 Claims, 12 Drawing Sheets

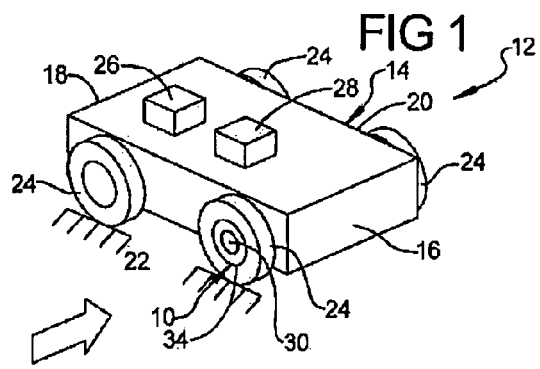
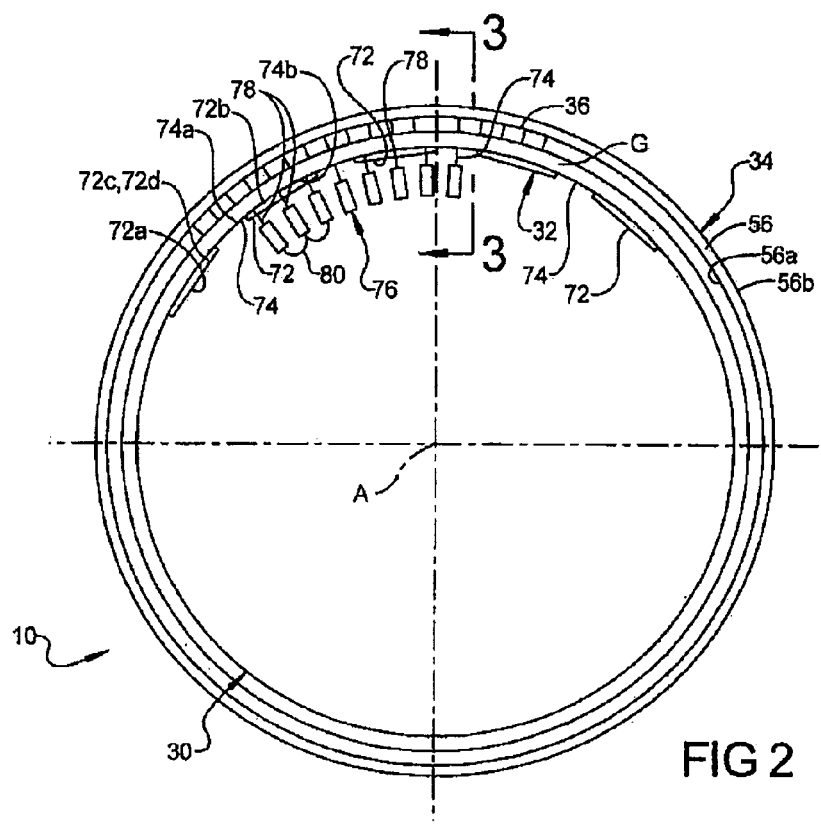

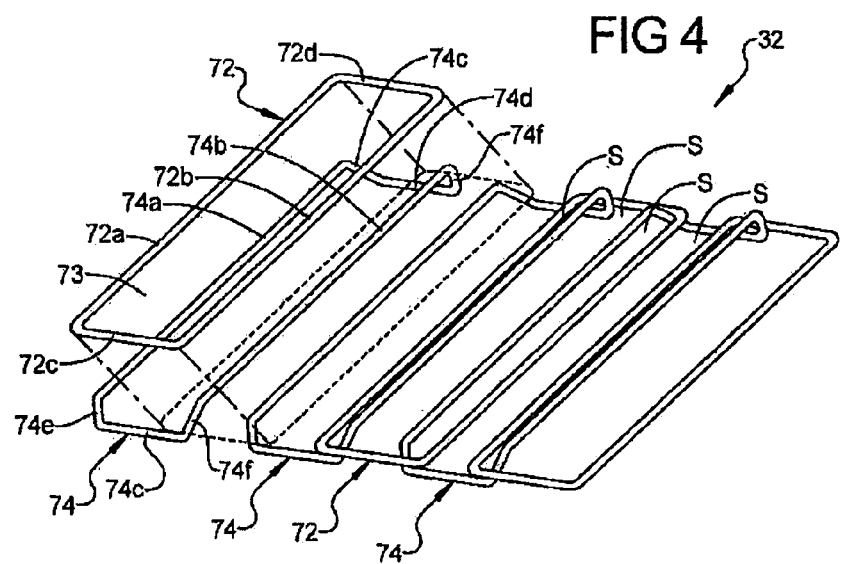
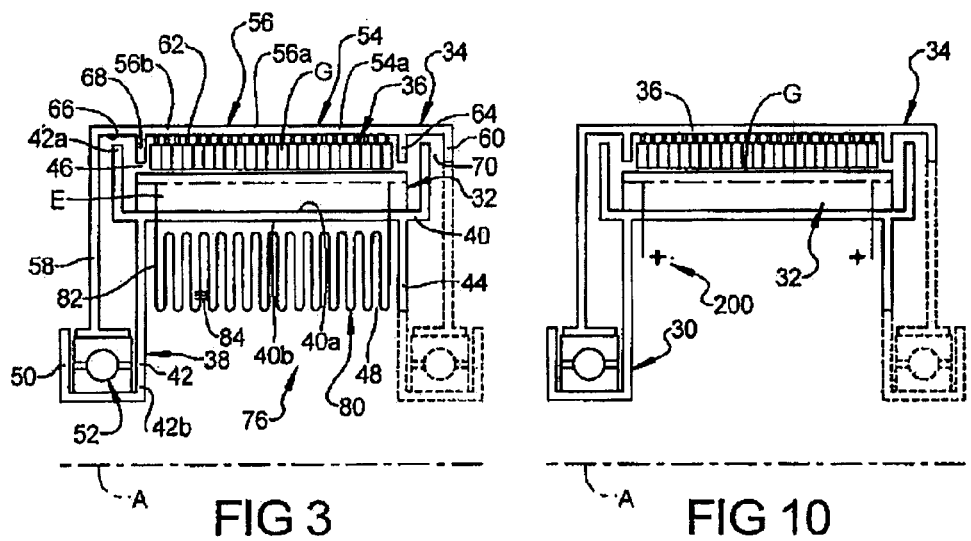

FIG 8
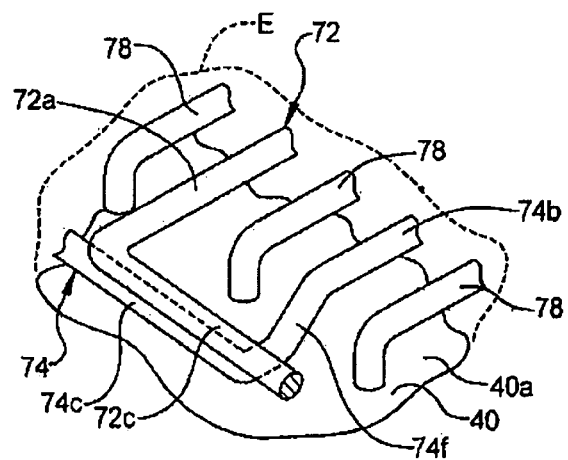
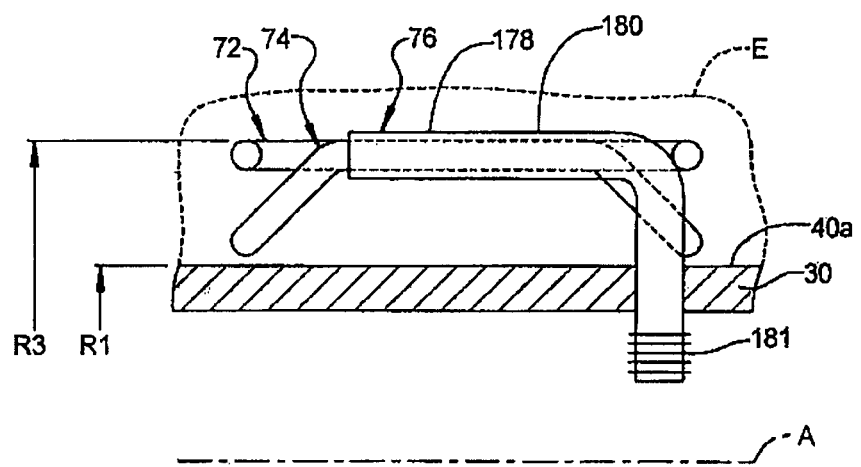
FIG 9

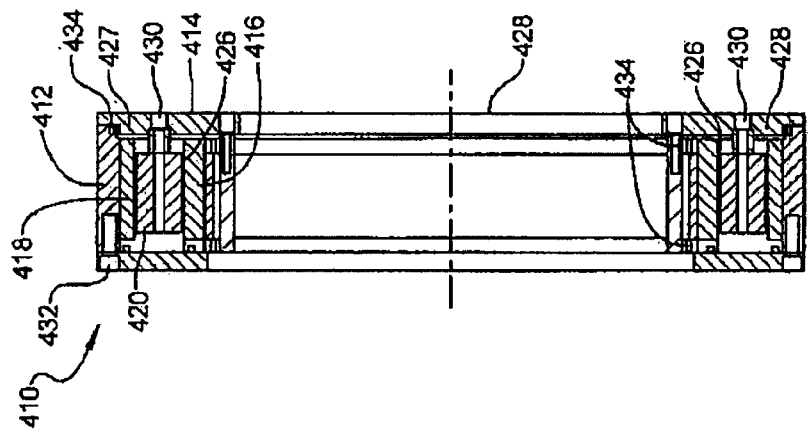
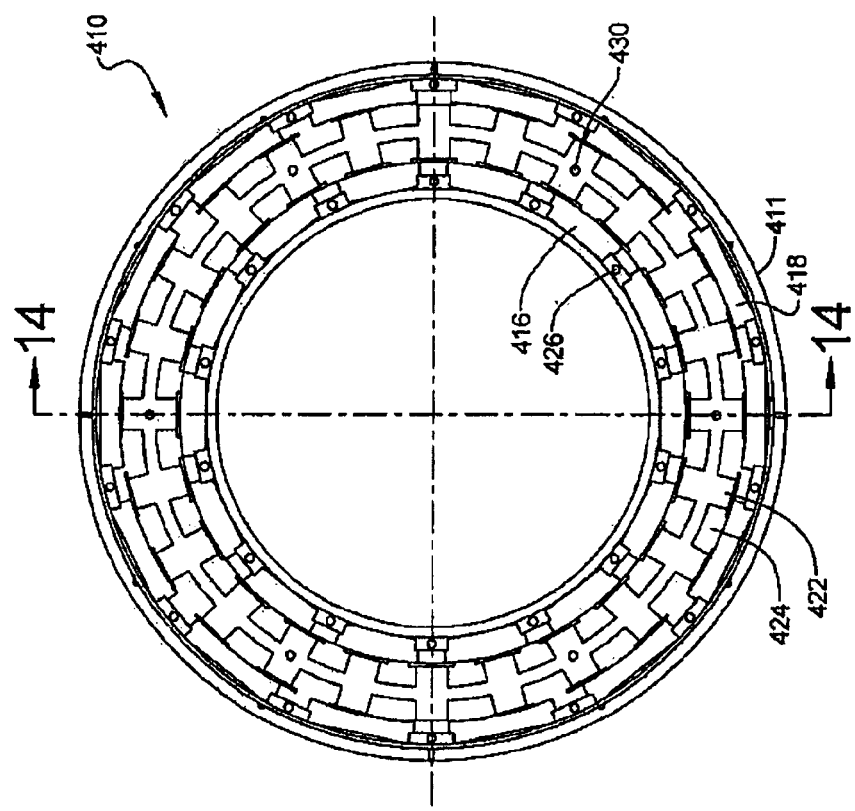

DUAL RADIAL GAP MOTOR-GENERATOR STRUCTURE

CROSS-REFERENCE TO RELATED APPLICATIONS

This application is a continuation-in-part application of U.S. patent application Ser. No. 12/469,143 filed May 20, 2009 now U.S. Pat. No. 8,247,943 for "MOTOR/GENERATOR STRUCTURE" the entire disclosure of which is hereby incorporated by reference, including all text and drawings.

BACKGROUND OF THE INVENTION

1. Field of the Invention

This invention relates generally to brushless rotary electrical motor/generator structures for producing an output voltage or mechanical power output in the form of rotational torque such as for use in rotating the wheel of a vehicle and propelling the vehicle; and more specifically, to a radial gap motor/generator wherein at least one thin annular array of magnets is mounted for rotation to a rotor in radially spaced relation to at least one thin annular induction structure fixedly arranged on a stationary stator. Even more particularly, the present invention is directed to a cooling arrangement or structure for transferring heat build-up and cooling the induction structure during operation of the motor/generator.

2. Description of Prior Art

In general, brushless electrical motors may be termed "axial gap" or "radial gap." In each, magnets are mounted on a rotor and an induction structure, or electrical coils, are mounted on a stator. In the axial gap motor, the coils and magnets are in juxtaposed relation with one another on respective co-axial circles and in respective axially spaced planes. In the radial gap motor, the coils and magnets are in radially spaced juxtaposed relation with one another in respective co-axially disposed cylindrical planes.

Axial gap motors employing coil armatures and brush commutation have been in use since the late 1950's. In a conventional (brushed) DC motor, the brushes make mechanical contact with a set of electrical contacts on the rotor (called the commutator), forming an electrical circuit between the DC electrical source and the armature coil-windings. As the armature rotates on axis, the stationary brushes come into contact with different sections of the rotating commutator.

Brushless disc-type axial gap motors were later developed, employing rotating magnets, coil stators and electronic commutation. In such brushless motor, the electromagnets do not move; instead, the permanent magnets rotate and the armature remains static. This gets around the problem of how to transfer current to a moving armature.

The brushless axial gap motor offers several advantages over brushed DC motors, including higher efficiency and reliability, reduced noise, reduced maintenance, longer lifetime (no brush erosion), elimination of ionizing sparks from the commutator, and overall reduction of electromagnetic interference. The maximum power that can be applied to a brushless motor is exceptionally high, limited almost exclusively by heat, which can damage the coils and affect the strength of the magnets.

Accordingly, an arrangement for obviating the deleterious effects of heat and temperature build-up in the brushless motor during operation thereof would be desirable and is an object of this invention.

Brushless axial gap motors have been used in large numbers in audio and video tape recorders and computer disc drives. In such a motor, a magnetic rotor disc with alternating North/South pole pieces rotates above and/or below a plane containing several flat, stator coils lying adjacent one another. Current flowing in the conductor wires of the coils interacts with the alternating magnetic flux lines of the disc, producing Lorentz forces perpendicular to the radially directed conductors and thus tangential to the axis of rotation. While current flows through the entire coil, only the radial extending portions of the conductors (called the working conductors) contribute torque to the rotor. See, for example, U.S. Pat. Nos. 3,988,024; 4,361,776; 4,371,801; and 5,146,144. A variation of this arrangement is known in which the circumferential portions (nonworking conductors) of the wire-wound coils overlap each other. See, for example, U.S. Pat. Nos. 4,068,143; 4,420,875; 4,551,645; and 4,743,813. While this arrangement allows closer packing of the working conductors, it also requires that the gap between the rotor's magnets and flux return be about twice as thick as would be required for a single thickness of a non-overlapping coil, thus reducing the magnetic flux density and thus reducing the motor's efficiency.

In view of the these disadvantages in the above-mentioned prior art, Kessinger et al. U.S. Pat. No. 5,744,896, issued Apr. 28, 1998, the specification of which is specifically incorporated herein in its entirety, discloses a motor which employs an axial gap magnetic structure wherein complementary faces of the stator and rotor are disposed in axially spaced relation and each receives, respectively, a flat array of coil winding segments and a flat array of permanent magnets, the segments and magnets of which being arranged in angularly spaced side-by-side relation and extending radially relative to the rotor axis of rotation. The coil winding segments are alike and each is generally trapezoidal and forms a ring shaped structure and the segments overlap with one another to form a thin planar electromagnetic structure. Electrical wires are wound about the coil structures and the longer legs (or sides) of the trapezoidal shape form the working portions of the coil windings.

Kessinger proposed that the individual coils making up a coil array be flat and rectangular in shape to form a thin disc coil array so as to maximize the electromotive interaction for a motor/generator of a given diameter and maximize the torque, which may be produced by a motor, or the voltage produced by a generator.

While believed useful for the purposes then desired, certain problems are believed to remain in an axial gap arrangement. During operation and rotation of the rotor, an outward radial shearing force is placed on the securement between the permanent magnets and the rotor face. Because of these forces and possible adverse effects of heat build up during continued use, the magnets may break free. Additional bonding material may be needed to overcome such situation, possibly resulting in increased cost and size of the structure.

Further, Kessinger proposes that the individual flat shaped rectangular coil structures closely abut one another and that individual coils be overmolded with a moldable material to form a suitable ring of suitable structural integrity and heat tolerance. However, such configuration suggests that some mechanism be provided to tolerate, but not transfer, heat from the coils during performance of their electrical motor function.

To overcome the deficiencies in the prior art this invention is a provision of a brushless radial gap motor/generator structure wherein the respective arrays of magnets and coil windings are separated by a radial gap, to minimize the outer dimensions of the resulting structure.

An object of this invention is provision of a brushless radial gap motor/generator structure that effectively obviates adverse effects occasioned by rotation of the rotor.

SUMMARY OF THE INVENTION

In accordance to the present invention there is provided an apparatus for propelling a vehicle, the vehicle including an axle and a wheel structure for mounting to the axle, the apparatus comprising: an electric motor for rotating the wheel and driving said vehicle, the motor configured for connection to an inner surface of said wheel structure and including a stationary member with a thin annular induction structure and adapted to be fixed to the axle, and a rotary member with a thin annular magnetic structure configured for securement to the wheel structure in a manner that the induction and magnetic structures are co-axially disposed, juxtaposed with one another, and radially spaced from one another, the induction structure including angularly offset first and second sets of first and second coil segments wherein each coil segment has two lateral side portions that extend axially and the coil segments overlap in a manner that the lateral side portions of each successive coil segment of the first set is overlapped, respectively, by the lateral side portions of the next preceding and succeeding coil segment of the second set, and each of the lateral side portions are angularly spaced and disposed in a common cylindrical plane.

Preferably, the induction structure is encircled by the magnet structure and a cooling structure is provided for cooling the induction structure, the cooling structure including a plurality of linear cooling/heat pipes, the pipes extending axially with a linear cooling/heat pipe being disposed in heat transfer relation between each successive pair of linear side portions.

Further, in another aspect hereof, there is produced a brushless radial gap DC motor which comprises: a stator and a rotor mounted for co-axial rotation about the stator, a succession of rectangular shaped coil windings disposed around the stator in angularly spaced side-by-side overlapped relation with one another and in a manner to form a thin substantially continuous cylindrical induction structure, and a succession of permanent magnets disposed around the rotor in angularly spaced side-by-side relation and in a manner to form a thin substantially cylindrical magnetic structure, the mounting being such that the cylindrical magnetic and induction structures are juxtaposed in respective cylindrical planes and the structures separated by a single cylindrical annular gap.

In a still further aspect hereof there is provided a brushless radial gap DC motor having a cylindrical induction structure comprising: a succession or series of rectangularly-shaped coil windings disposed around a stator in angularly spaced side-by-side overlapping relation. This configuration forms a thin, substantially continuous cylindrical induction structure. The motor further includes a series or succession of permanent magnets disposed around both the outside and the inside diameters of the induction structure to form a dual-faced cylindrical magnetic structure.

The magnetic structure and the induction structure are mounted to a rotor and stator in juxtaposition in respective cylindrical locations such that the structures are separated by two cylindrical gaps.

Preferably, the magnetic structure is in encircling relation about and around the induction structure and the coil windings comprise a succession of first coil winding segments that overlap a like succession of second coil winding segments.

In some applications, the motor structure is comprised of iron, for concentrating and directing magnetic flux. In other applications, and as an option for reducing weight, the DC motor structure is ironless or comprised of a magnetically permeable material.

Preferably, the brushless radial gap DC motor further comprises means for cooling and transferring heat buildup in the succession of coil windings arising from electrical current passing through the coil windings and operation of the motor, the means for cooling including a plurality of cooling tubes or pipes interposed and nested relation between and in cooling relation with respective successive pairs of overlapping coil windings.

Preferably, the cooling pipes are configured as heat pipes that operate on the principle of the vapor phase transfer of heat from the coil windings. Removal of heat is achieved by changing the phase of a coolant in the heat pipe from a liquid into a vapor phase and routing the vapor to an area remote from the heated source, where it is cooled and converted back to a liquid.

Optionally, the cooling tubes or pipes may transfer heat from the coils to an ambient air or otherwise cooled suitable heat sink remote from the motor-stator, preferably off-site from an open or inner surface of the stator.

Preferably, the succession of permanent magnets is arranged in a Halbach array. In some applications, the magnets may be arranged into a standard N/S/N/S pole array.

Preferably, the coil windings comprise alternating sets of first and second coil segments, the segments being differently configured for nested interfitment with one another and each segment having an electrical conductor wire coiled about and into a generally rectangular ring shaped structure, wherein successive coil winding segments of the first set are juxtaposed and overlap with successive pairs of coil winding segments of the second set with the two sets being arranged to form the thin cylindrical annular induction structure.

In this arrangement, the longer sides of the rectangular shaped coil segments extend axially and the shorter ends extend circumferentially, the longer sides form a common cylindrical plane, and the overlapped sets of coil segments form a succession of axially extending angular recesses or gaps dimensioned to receive a respective of the cooling/heat pipes.

The means for cooling further includes a heat sink, the heat sink mounted to the stator and to at least one of the succession of cooling pipes. The cooling pipes extend axially, are disposed in the cylindrical plane defined by the coil segments, and nested in close proximity to a pair of the longer side portions of adjacent of the overlapped coil segments.

In an important option, the cooling/heat pipes are comprised of an electrically conductive material and shunted to provide a closed loop and serve not only in the heat transfer capacity. Further, by being in the same cylindrical plane defined by the longer axially extending legs of the coil segments, the heat pipes provide the generation of magnetic flux and electromotive force in the presence of the rotating magnetic (Halbach) array.

In some applications, the cooling pipes are in communication with one another, such as via a manifold, and form a single reservoir and fluid pump system to communicate cooling fluid to each of the cooling pipes and each of the succession of cooling pipes. According to this aspect of the invention, the fluid path may comprise a closed loop and an open loop.

In a further aspect hereof, there is provided an electric motor/generator having at least two spaced apart annular rings each having an inner surface and outer surface, the annular rings having a permanent magnet structure comprising a plurality of circumferentially spaced apart magnets, the magnets being disposed between the inner surface and outer surface of the annular rings, the respective North and South poles of the magnets placed adjacent one another and disposed proximate the induction structure in reversing polarities. The magnets disposed between the inner and outer surface of the annular rings can be embedded within the annular rings and bonded in place. Alternatively, the annular rings can have a plurality of slots formed between in their respective inner circumferential surface and outer circumferential surface allowing the magnets of the permanent magnet structure to be fittedly secured within each of the plurality of slots.

The electric motor generator of this embodiment can also include a heat sink. Additionally, the induction modules, wound wire coil segments, and heat sink are secured in position relative to one another with a polymer over-mold.

The electric motor/generator is also capable of being attached to a printed circuit board, having tracks and track termination holes. In such an embodiment, the opposed ends of the wire wound coil segments fittedly attach to the printed circuit board at the track termination holes.

In another preferred embodiment according to this invention there is provided a brushless DC motor, comprising:
  a. a stator having an outer surface and a cylindrical annular induction structure juxtaposed in encircling relation around the outer surface, the induction structure comprising first and second sets of wire wound coil segments disposed in respective cylindrical planes with successive coil segments of the first set being angularly offset from and juxtaposed with pairs of successive adjacent pairs of coil segments of the second set, the coil segments having a long dimension disposed axially and the overlapped portions forming a succession of angularly separated axial recesses,
  b. a rotor having a cylindrical inner surface and a cylindrical annular permanent magnet structure juxtaposed in encircling relation around the inner surface,
  c. means for mounting the rotor and stator to one another for relative coaxial rotation about a center axis and in a manner that a cylindrical annular radial gap separates the induction structure from the magnet structure, and
  d. a succession of cooling tubes or heat pipes, said tubes and heat pipes being nested, at least in part, in successive of the axial recesses for cooling heat buildup in the coil segments.

Preferably, in these motors, the nested coil segments and cooling pipes/tubes are encapsulated in a heat transferring epoxy.

In another preferred embodiment according to this invention there is provided a brushless DC motor, comprising:
  a. a stator, said stator including a cylindrical induction structure,
  b. a rotor, said rotor including a cylindrical magnet structure,
  c. means for mounting the rotor to the stator for coaxial rotation relative thereto and relative to a common central axis of rotation thereof, said mounting spacing the magnet structure from the induction structure and in a manner that a thin uniform cylindrical annular radial gap is formed between the structures of the rotor and stator, and
  d. means for cooling the induction structure, said means for cooling including a succession of heat transferring cooling tubes or pipes being nested, at least in part, in angularly spaced relation in said induction structure.

Preferably, the means for cooling comprises a vapor phase tube, wherein said tube is linear and comprised of an electrically conductive material, such as copper or aluminum.

In yet another preferred embodiment according to this invention there is provided an improved brushless DC motor, the motor including a rotor mounted for rotation about a stator and an arrangement of electrical wire wound coils and permanent magnets that operate to convert electric current into mechanical power, the improvement comprising:
  a. said rotor and stator, respectively, including a cylindrical inner face and cylindrical outer face,
  b. means for mounting the rotor and stator in a manner that the inner and outer faces are centered in coaxial relation on a common central axis and separated by an annular gap and the inner face of said rotor is mounted for rotation relative to outer face of said stator,
  c. said wire wound coils include a first set of identically shaped first coil segments and a second set of identically shaped second coil segments, each said coil segment being generally thin, rectangular and ring shaped and including first and second side portions and first and second end portions, the side portions of each of the coil segments being substantially of the same length and forming a respective first plane and the end portions of the first set of coil segments extending at an acute angle from the side portions thereof and to the respective first plane, and
  d. means for mounting the wire wound coils around the outer face of the stator in a manner that the coil segments of each set are angularly spaced from one another and the coil segments of the first set are arranged in alternating and overlapping relation with the coil segments of the second set, the first and second side portions of the coil segments extending axially with their axes parallel to and centered on the axis of rotation and wherein the first and second side portions of each coil segment of the first set is overlapped with the second and first side portions, respectively, of the next succeeding and preceding coil segments of the second set, the end portions of each of the coil segments of the first set of coil segments enabling the coil segments to overlap and position the side portions in angularly spaced side by side relation.

Desirably, the present invention provides a relatively lightweight, high torque radial gap motor/generator that obviates the problems of overheating during operation. Importantly, the arrangement may be used with a variety of rotary electromotive devices.

Additional objects, features, and advantages of the present invention will be readily appreciated, as the same becomes better understood after reading the subsequent description taken in conjunction with the accompanying drawings.

OBJECTS OF THE INVENTION

Another object of the present invention is the provision of specially configured coil windings that overlap with one another and assemble to form a thin annular cylinder of a given diameter and substantially uniform thickness to provide electrical induction, and a cooling structure in the form of an array of angularly separated cooling pipes that nest within angular axially extending gaps formed by and between successive of the coil windings wherein to cool the coil winding segments during operation of the motor/generator, allow increased interaction between coils and magnets, and improve the power conversion with the motor or generator. The cooling pipes may comprise what are called heat pipes and are vapor phase heat transfer mechanisms that can transport large quantities of heat with a small difference in temperature between hotter and cooler interfaces. In connection with the radial gap motor according to this invention, the heat pipe can transport heat against gravity by an evaporation-condensation cycle.

A still further object of this invention is the provision of an electric drive system for a motor vehicle, which is drivingly connected to the inner rim of at least one, and if desired, the inner rims of each respective vehicle wheel, and which eliminates conventional chassis mounted power systems, drive trains and hub mounted wheel-axle power train systems.

A still further object of the invention is to provide a more compact, higher power, high torque, and high efficiency electric motor/generator, utilizing permanent magnets. A yet further object of the invention is the provision of a high volume, cost effective, manufacturing process that assures the necessary accuracy and consistency in the dimensional aspects of the respective components in a compact, high power, high efficiency electric motor/generator.

For a more complete understanding of the present invention, reference is made to the following detailed description and accompanying drawing. In the drawing, like reference characters refer to like parts throughout the several views

BRIEF DESCRIPTION OF THE DRAWINGS

FIG. 1 is a perspective view of a wheeled vehicle that includes a motor in wheel drive arrangement, according to this invention;

FIG. 2 is an elevation view of a first preferred embodiment of a single radial gap brushless DC electric motor according to this invention, such as seen looking in the direction of the arrow 2 in FIG. 1 and at a wheel seen on one side of the motor vehicle and;

FIG. 3 is a section view of the electric motor, according to this invention, taken along line 3-3 of FIG. 2, illustrating a stationary induction structure and a rotating array of permanent magnets separated by a radial gap and a cooling structure in nested relation with the induction structure;

FIG. 4 is a perspective view of the induction structure, according to this invention, showing first and second sets of differently configured wire wound induction coils being assembled about a stator in angularly offset, side-by-side overlapping relation with one another;

FIG. 8 is a perspective view looking down at portions of a coil segment of the first set positioned in spaced relation atop and in spaced relation to a coil segment of the second set and the relation of the cooling pipes to the side and end portions of the coil segments;

FIG. 9 is an elevation view of a heat pipe cooling arrangement according to this invention;

FIG. 10 is a sectional view of a second preferred embodiment of a single radial gap brushless DC electric motor, according to this invention, which is similar to the motor of FIG. 2 but wherein the cooling system is an air cooled closed loop tube manifold system, FIG. 13 is a elevation view of dual gap motor in accordance with the present invention, FIG. 14 is cross-sectional view taken along line 13-13 of FIG. 13.

DETAILED DESCRIPTION OF THE INVENTION

Figure 5:
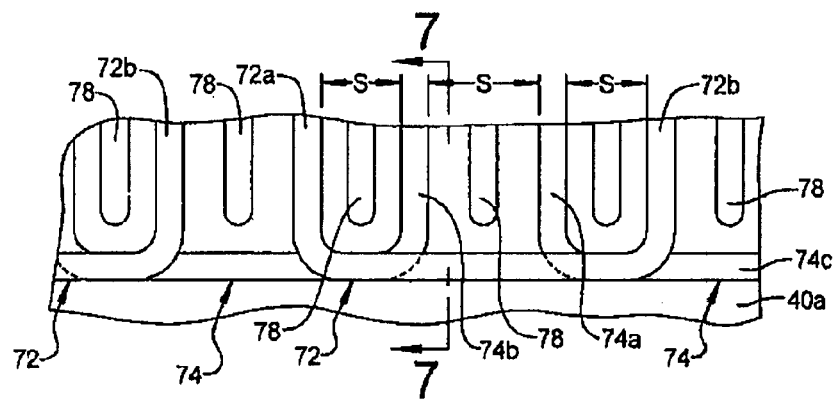
FIG. 5 is a plan view of the induction structure and cooling pipes nested in gaps formed between overlapped side portions of the coil segments.

Referring now to the drawings, FIGS. 1-9 and FIG. 10, respectively, illustrate preferred embodiments of a brushless, ironless, synchronous, DC, single radial gap, electric motor or generator, according to this invention. As used herein, the apparatus of each embodiment is referred to as an electric motor, which produces mechanical power output in the form of rotational torque.

The electric motor of each embodiment includes a stator or stationary structure, a rotor mounted for rotation relative to the stator in a manner that a surface of the rotor is separated from a corresponding surface of the stator by a radial gap to form a cylindrical annular gap therebetween, a succession of permanent magnets, or annular magnet structure, is mounted to a surface of the rotor for rotation therewith and in juxtaposed relation with an electromagnetic induction structure mounted to a surface of the stator.

In the embodiments described herein, the rotor and magnet structure rotate about the induction structure disposed about the stator, the magnets being on an inner surface of the rotor and in encircling relation with the induction structure. In other applications, the magnet and induction structure could be reversed, with the stator and induction structure encircling the rotor and magnet structure, the stator and rotor mounted on a common axis, and the rotor mounted for rotation within the stator.

Further, the motor of each preferred embodiment includes a respective cooling arrangement for cooling the induction structure of the motor during operation thereof.

Depending on the application, the electric motor may be stationary or used to power and propel a wheeled vehicle, such as a motorcycle, motor vehicle, bus, golf carts, and the like. The conventional motor vehicle is propelled by the energy of an internal combustion engine being transmitted via a drive train to the axles and/or one or more wheel structures, whereby the drive train rotates the wheels.

In a preferred embodiment, according to this invention herein, the electric motor of FIGS. 2-9 is used to propel a motor vehicle in what may be referred to as a "motor-in-wheel" system. In this application, the internal combustion engine and drive train are eliminated and at least one wheel structure of the vehicle is mounted to the outer surface of the rotor.

Referring to FIG. 1, a motor vehicle is generally indicated by the reference number 12 and includes a chassis 14 having forward and rearward ends 16 and 18, lateral sides 20 and 22, and four respective wheel structures 24 connected to the chassis for rotation relative thereto by respective axle or power train structure.

A motor 10 according to this invention is fitted into a wheel structure 24. The mounting of the motor 10 to the wheel structure is not shown as being understood by those skilled in the art. Additionally, a motor in wheel arrangement is described in U.S. Pat. No. 6,851,496, issued Feb. 8, 2005, to the Applicant herein, the disclosure of which is incorporated herein in its entirety.

In general, however, as will be described in greater detail herein below, the motor 10 includes a rotor 34 having an outer surface 56b and a stator 32 having a bearing sleeve 50 coaxial with the rotor. The outer surface is fitted to an inner surface of the wheel structure and the bearing sleeve 50 is fitted to the axle associated with the wheel structure.

The motor vehicle chassis 14 is suitably configured to mount an electrical power source in the form of a conventional DC battery 26 and a vehicle management controller 28. The management controller 28 is in communication with an on board computer and is adapted to receive, compare, and send signals substantially simultaneously to a motor in wheel, and direct the battery to supply electrical energy as needed.

Supplying electricity to the DC motor 10, according to this invention, and which will be described in detail, generates an electrical induction that operates on the poles of the magnet structure to generate an EMF that is tangent to the rotor, producing torque on the rotor, causing the rotor to turn and the wheel to rotate, thereby propelling the vehicle.

Referring to FIGS. 2 and 3, the first embodiment of a brushless DC electric motor 10 according to this invention includes a stationary member, or stator 30, an annular electrically conductive induction structure 32 fixedly mounted about the stator, a rotating member, or rotor 34, and a thin annular magnet structure in the form of an array of permanent magnets 36 fixedly mounted to the rotor 34 for rotation therewith. The rotor 34 and stator 30 are coaxial to one another and centered on a common central geometrical axis "A" and the rotor is mounted for rotation about the stator and the axis "A". The magnet structure or array of permanent magnets 36 is in circumposed encircling relation with the induction structure 32 and the magnets and induction structure are radially separated from one another by a single, generally thin, uniform annular or radial gap "G".

The induction structure 32 is in electrical circuit relation with the battery 26 and the control or operating member, which is shown herein as the management controller 28.

The stator 30 comprises a generally cylindrical cup-shaped stator frame 38, the stator frame including a cylindrical wall 40 that has outer and inner cylindrical surfaces 40a and 40b, respectively, centered on the central geometrical axis "A" and rearward and forward radial end walls 42 and 44. The stepped radial end walls 42 and 44 are axially spaced, radially stepped mirror images of one another, and cooperate with the cylindrical wall 40 to form an outwardly opening channel 46 and an inwardly opening chamber 48. The radial end walls 42 and 44, respectively, terminate in radial outward ends 42a and 44a.

The rearward radial end wall 42 terminates in an inward radial end portion 42b that is configured to form both an annular outwardly opening channel 50 for receiving a roller bearing 52 and a cylindrical sleeve for mounting to a suitable stationary support, such as to the axle of the vehicle 12 when used in conjunction with the "motor-in-wheel" arrangement described hereinabove.

As will be described hereinbelow, the outwardly opening channel 46 is configured to receive the induction structure 32, and at least in part, heat receiving elements of the motor cooling structure, and the chamber 48 is configured to house, at least in part, heat dissipating elements of the motor cooling structure.

The rotor 34 comprises a generally cylindrical cup-shaped rotor frame 54, the rotor frame including a cylindrical wall 56 that has cylindrical inner and outer surfaces 56a and 56b, respectively, centered on the central geometrical axis "A", axially spaced radial end walls 58 and 60, which extend radially inwardly from the opposite axial ends of the cylindrical wall 56 and form the rearward and forward ends of the rotor frame, a pair of axially spaced radial walls 62 and 64, which are disposed between the end walls 58 and 60 and extend radially inwardly from the inner surface 56a of the cylindrical wall 56, and radially inwardly opening channels 66, 68, and 70. The rearward end wall 58 has an inward radial end portion 58a fixedly attached to the roller bearing 52 whereby to mount the rotor frame 54 to the stator frame 38 for coaxial rotation relative thereto and the axis "A".

The inwardly opening channels 66 and 70 form annular recesses that receive the outer radial end portions 42a and 44a of the stepped rearward and forward end walls 42 and 44 of the stator frame 38 and coaxially center and align the inwardly opening channel 68 in encircling juxtaposed relation with the outwardly opening channel 46 of the stator frame 38.

Preferably, as shown by the phantom lines in FIGS. 3 and 10, the rotor and stator walls 60 and 44 cooperate to form a bearing support 52 in a manner similar to that shown to the right, thereby forming a symmetrical stabilized support structure.

The annular array of permanent magnets 36 comprises a succession of separate permanent magnets that are disposed in side-by-side abutting relation to one another with the respective North and South poles of successive magnets being adjacent one another to form a continuous generally cylindrical thin magnet structure centered on the axis "A". While many magnets are known and available, a preferred magnet is the Neodymium-Iron-Boron magnet, known for its providing high power in a small size.

Preferably, the permanent magnets are formed into what is termed a Halbach array. While the Halbach array will not be described in detail herein as being understood by those skilled in the art, the arrangement of permanent magnets increases the magnetic flux on one side of the device while reducing the flux to near zero on the other side.

Preferably, an elastomeric material "E" is used to bond and fixedly mount the permanent magnets and/or Halbach array against the inner surface 56a of the cylindrical wall 56 of the rotor frame 54.

Rotation of the rotor 34 operates to apply outward radial forces against the magnet structure 36, forcing the array and respective magnets thereof radially outwardly and against the inner wall 56a of the rotor, thereby obviating the development of axial shearing forces. Desirably, the positioning of the magnet structure against the inner surface of the rotor channel results in a less expensive elastomer being needed, less elastomer to position the magnets, and a reduction in the weight of the assembly formed.

As shown in FIG. 4, the induction structure 32 is comprised of a first set of coil segments 72 and a second set of coil segments 74 with the coil segments 72 and 74 of each set, respectively, being disposed, respectively, in the channel 46 of the stator frame 38 and in concentric first and second "cylindrical planes" coaxially centered with one another, the axis "A" and about the outer surface 40a of the stator wall 40. The coil segments 72 and 74 are generally rectangular and form a ring shaped structure having a central open area and include an electrical wire that is successively wound into the rectangular shape and in encircling relation with the central area.

The coil segments 72 and 74 of the first and second sets, respectively, are equiangularly spaced from one another in a manner that each coil segment of one set is radially spaced and angularly positioned in overlapping relation with a successive pair of coil segments of the other set. As shown in FIG. 4, for illustration, each segment 72 and 74 comprises an electrically conductive wire wound into the desired shape. The ends of the conductive wires are connectible in electrical circuit relation to the management controller 28. The connection of the wire ends is not shown as being understood by one skilled in the art.

Referring to FIGS. 4-8, the induction structure 32 and coil segments 72 and 74 are shown in greater detail. The coil segments 72 and 74 are similar but differ in shape in a manner to allow successive coil segments of one set to overlap with successive pairs of adjacent coil segments of the other set as well as to define equiangular axially extending gaps or recesses "S" to receive cooling structure needed to transfer heat from the coil segments during operation of the motor. The coil segments 72 are shown "blackened" for clarity to show overlapped fitment with the coil segments 74.

The coil segment 72 is generally planar and includes two long legs or sides 72a and 72b and two short legs or ends 72c and 72d, the respective pairs of legs being conjoined at right angles to one another to one another to form a rectangular ring shaped structure having a central opening 73. The legs and sides are generally linear with the length of the short legs 72c and 72d being less than the length of the long sides 72a and 72b.

The coil segment 74 in plan is generally rectangular shaped and includes two long legs or sides 74a and 74b, two short legs or ends 74c and 74d, and extenders 74e and 74f that conjoin the long sides to the ends 74c and 74d to form a ring shaped structure having a central opening 73. The legs, sides, and extenders are generally linear with the length of the ends 74c and 74d being less than the length of the long sides 74a and 74b and substantially the same length as the short ends 72c and 72d. The sides 74a and 74b form a first plane, the ends 74c and 74d form a second plane, and the extenders 74e and 74f are at an angle θ to the first plane and position the planes to be generally parallel to one another. In some applications, as shown in FIG. 6, the extenders are also at an acute angle "α" to the second plane.

The coil segments 72 and 74 are such that the lateral separation between the long sides 72a and 72b of the coil segment 72 and long sides 74a and 74b of the coil segment 74 are substantially the same.

Referring to FIG. 4, illustrating an assembly of the inductions structure 32, the set of coil segments 74 are disposed about the stator surface 40a in equiangularly spaced relation to one another with the short legs or ends 74c and 74d being proximate to the outer surface 40a of the stator frame 38, and the set of coil segments 72 are disposed above and about the coil segments 74 in equiangularly spaced relation to one another with the short and long legs thereof spaced from the short and long legs of the coil segments 74. Importantly, lateral side portions of successive coil segments 72 of one set of coil segments are angularly offset with successive pairs of lateral side portions of adjacent coil segments 74 therebelow and which form the other set of coil segment.

Figure 6:
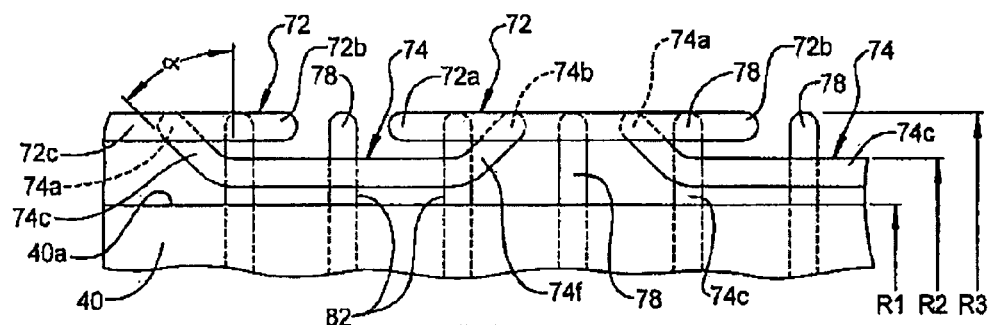
FIG. 6 is an end elevation view of the arrangement shown in FIG. 5 to illustrate the offset relation of the first and second sets of coil segments and the nested relation of the cooling pipes in the gaps formed between overlapped side portions of the two sets of coil segments.

Referring to FIGS. 5 and 6, when assembled to the stator frame 38, the coil segments 72 and 74 are overlapped with the long sides of the coil segments 72 and 74 axially extending, in a common cylindrical plane centered on the axis of rotation "A" and forming a repeating equiangularly spaced sequence, such as 72a, 74b, 74a, 72b, 72a, 74b, 74a, and so on. The lateral width of the coil segments is such that the overlapped long leg side portions divide the central open areas 71 and 73 of the coil segments 72 and 74 into three equiangular axial recesses "S" that receive cooling pipes to transfer heat from the coil segments during operation.

Figure 7:
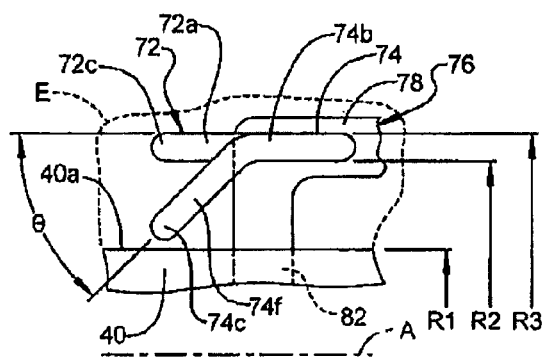
FIG. 7 is a side elevation view, taken along line 7-7 of FIG. 5, illustrating the relation between the end portions of respective coil segments of the first and second sets of coil segments and a cooling pipe nested in the induction structure so formed.

Referring to FIGS. 6 and 7, the angled extenders 74e and 74f at the opposite axial ends of the sides 74a and 74b of the coil segments 74 enable the opposite axial end portions of the coil segments 72 to be lowered about the corresponding axial end portions of adjacent coil segments 74 therebelow in manner that all of the long side legs are coplanar. This is important because while current flows through the entire coil winding of each coil segment, only the longer length sides 72a, 72b, 74a, and 74b contribute torque to the rotor 34. This overlapping arrangement provides a denser packing of the conductors, improves magnetic flux path, and concentrates the motor windings.

Depending on the application, the extenders may be disposed in planes that are perpendicular to the first plane (defined by the sides 74a and 74b) and the second plane (defined by the ends 74c and 74d).

Referring to FIG. 3 and FIGS. 5-8 and according to an important feature of this invention, a cooling structure 76 is provided for cooling the coil segments 72 and 74 during operation as illustrated, the cooling structure includes a plurality of angularly spaced axially extending pipe portions 78 and associated heat sinks 80.

The heat sink 80 is specifically associated with a heat pipe and includes an elongated coolant vapor delivery pipe and wicked fluid return path 82 that, at least in part, extends through the cylindrical wall 40 of the stator frame 38, is disposed in the chamber 48, and has opposite ends thereof in operating communication with opposite respective ends of a cooling pipe 78 associated therewith to wick the cooling fluid from the heat sink to the cooling pipe and return heated coolant vapor to the associated heat sink. The fluid delivery pipe 82 is reversely bent to form a series of undulations and is disposed in the chamber 38 and, depending on the application, may be provided with a plurality of thin cooling fins 84 to further assist in heat transfer.

The pipe portions 78 extend from the stator frame and into the channel 46, and extend axially between the radial walls 42 and 44.

Important to the invention herein, the pipe portions are disposed in respective of the axial gaps "S" formed between successive of the longer side legs 72a, 74b, 74a, 72b, 72a, and so on. The legs of the coil segments 72 and 74 are dimensioned such that each of the long legs is juxtaposed with and in close parallel proximity to a cooling pipe 78.

Preferably, and referring to FIG. 8, an epoxy bonding material "E" is disposed within the channel 46 to fix the coil segments 72 and 74 of the induction structure 32 and the pipe portions 78 of the cooling structure relative to one another and to the channel 46 of the stator frame. Preferably, the epoxy has good heat transfer properties to rapidly and uniformly effectuate transfer of heat build-up from the coil segments to the pipe portions.

Further, referring to FIGS. 7-8, the dotted lines indicate the epoxy "E" that is used to fix the coil segments and pipe portions relative to one another. Further, in FIG. 6, the reference numbers R1, R2, and R3, respectively, refer to a radius extending from the axis "A" to the cylindrical outer surface 40a of the stator channel 46, the "cylindrical plane" formed by the long sides 74a and 74b of the succession of respective coil segments 74, and the "cylindrical plane" formed by the long sides 72a and 72b of the succession of respective coil segments 72 and 74.

According to this invention, and referring to FIG. 10, the cooling structure 76 preferably comprises a heat pipe 178, which comprises a hermetically sealed hollow tube 180 and includes a working fluid and a wick structure (not shown). As known in the art, the heat pipe is a vapor phase heat transfer mechanism that can transport large quantities of heat with a very small difference in temperature between hotter and colder interfaces. Inside the heat pipe, at the hot interface, formed by the body of epoxy heated by the coil segments, the fluid turns to vapor and the gas naturally flows and condenses on the cold interface. The liquid falls or is moved by capillary action back to the hot interface to evaporate again and repeat the cycle. To enhance heat transfer, as an option, cooling fans 181 may be provided.

Preferably, and according to this invention, the heat pipe is comprised of a thermo-conductive material such as copper, or possibly aluminum. The electrically conductive copper material of the pipe portions extend substantially the entire length of the long sides of the coil segments and cooperate to further develop magnetic flux, tangential EMF forces, and axial force to the rotor. The heat pipe thus forms a continuous loop whereby the additional forces and flux created thereby opposes the magnetic field generated by the magnet structure to create a magnetic cushion between the rotor and the stator on which the rotor rotates. This same cushion effect can be achieved with a loop of conductive material regardless of it functioning as a heat pipe.

In applications employing a circulatory liquid cooling system, and referring to FIG. 10, the heat sinks are in communication with one another via a manifold 200, which in turn is in communication with a single reservoir and a secondary fluid pumping system and cooling device such as a radiator.

Figure 11:
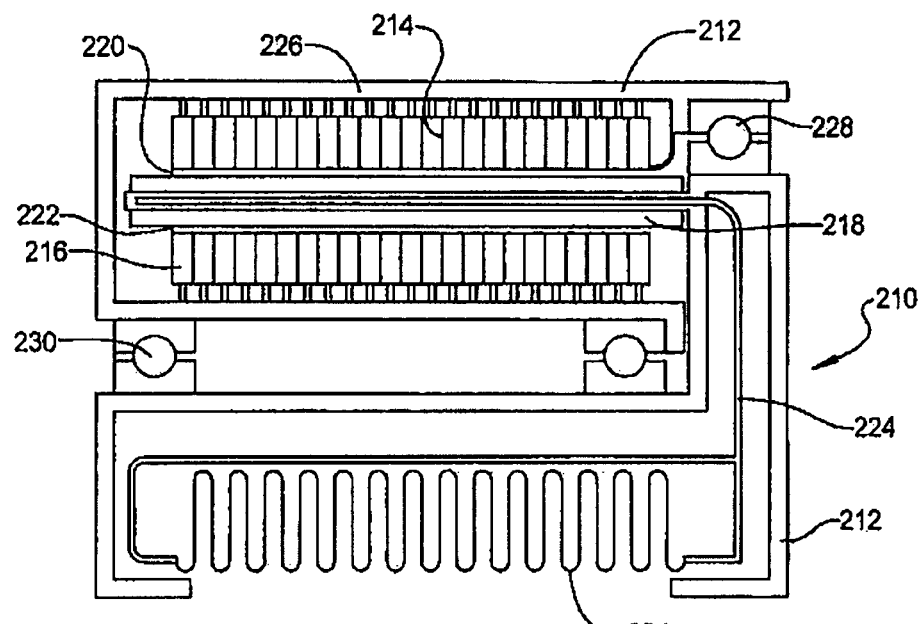
FIG. 11 is an elevation view of a third embodiment hereof where the motor has a dual gap, and a heat pipe cooling system.

Referring now to FIG. 11, there is depicted therein a further embodiment hereof, generally, denoted at 210. According to this embodiment, a rotor 212 has a pair of magnets 214, 216 mounted therein. An induction structure 218 such as that described hereinabove is disposed intermediate the magnets 214, 216. Thus, a first cylindrical annular gap 220 is defined between the magnet 214 and the induction structure 218 and a second gap 222 is defined between the magnet 216 and the induction structure 218, as shown. The magnets and induction structure are juxtaposed in respective cylindrical planes and are separated by the cylindrical annular or radial gap.

A heat pipe 224 is mounted to a stator 226 in the manner described hereinabove and is in fluid communication with the induction structure, again, as described above. Bearings 228, 230 are, also, provided.

Figure 12:
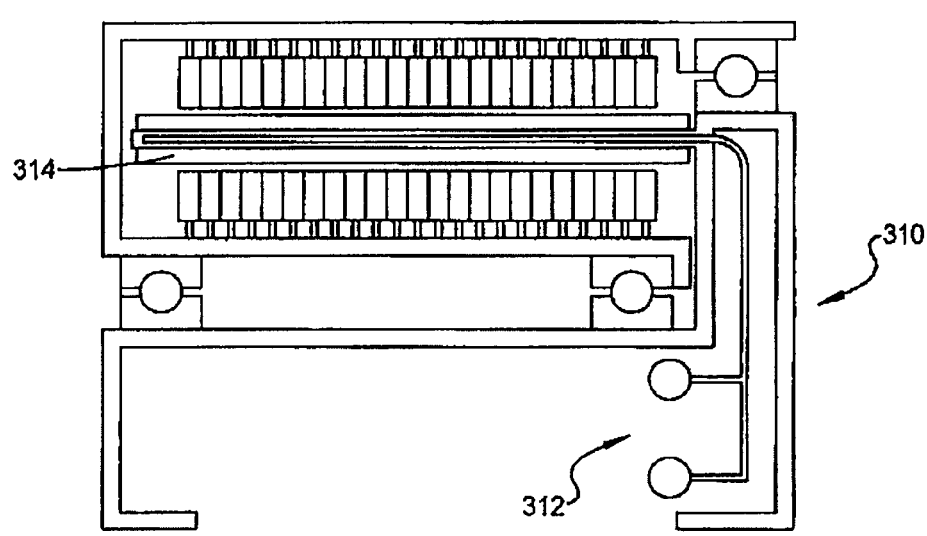
FIG. 12 is an elevation view of the dual gap motor of FIG. 11 but utilizing a liquid cooling system.

In FIG. 12, there is shown a modified dual gap motor 310. Here, a manifold 312, for circulating cooling fluid, e.g. a cooling liquid, is in fluid communication with the induction structure 314. In all other respects this embodiment is the same as that of FIG. 11.

Referring now to FIGS. 13 and 14 there is depicted therein a further embodiment of the present invention. According to this embodiment, there is provided a multiple gap motor, generally, denoted at 410.

According to this embodiment there is provided a motor 411 which comprises a rotor 412 and a stator 414 which are arrayed in a substantially circular manner, as shown.

Disposed about the circumference of the motor are a plurality of inner ring magnets 416 and a plurality of outer ring magnets 418. The inner ring magnets and outer ring magnets are axially displaced by a sufficient distance to accommodate a coil assembly or induction structure 420 therebetween.

The coil assembly 420 is disposed between the inner ring magnets and the outer ring magnets, as shown. The coil assembly comprises a core 422. The core 422 comprises a magnetic material such as iron or the like.

Windings 424 are disposed about the core 422. The windings are preferably copper windings although other conductive materials may possibly be used such as aluminum, silver, carbon fiber or the like. The windings may be of any suitable construction from conventional wound wire of different cross sections for general application, to film coil and printed circuit windings for more specialized motor applications. Similarly, the windings themselves may take any suitable configuration such as non-overlapping, overlapping, layered, etc.

As shown in the drawing a first inner gap 426 is provided between the inner ring magnets and the coil assembly. Similarly, a second gap 427 is provided between the outer ring magnets and the coil assembly.

The entire rotor-assembly is rotatably mounted to a stator frame 428 for rotation therearound. The stator frame 428 is secured to the coil assembly or induction structure via a bolt assembly 430 which projects through suitable apertures in the stator frame and into the core 422.

A plurality of bearings 434 are circumferentially disposed about the core 422 and windings 424 which are attached to the stator frame that together constitute the stator assembly to enable the rotor to rotate thereabout.

The rotor-stator motor assembly hereof can be deployed in connection with the motor and wheel drive system as shown in U.S. Pat. Nos. 6,948,578 and 6,851,496, the disclosures of which are hereby incorporated by reference.

Figure 15:
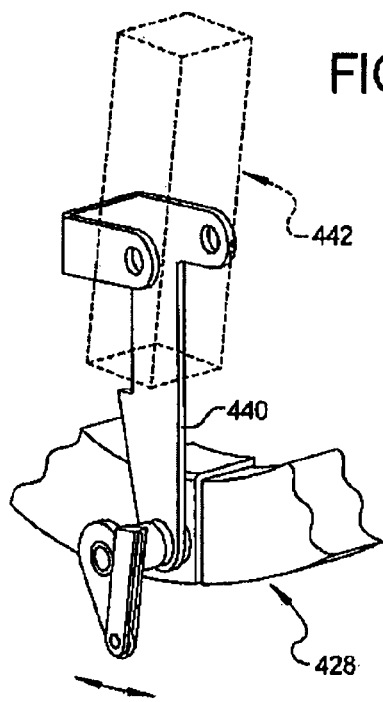
FIG. 15 is a perspective view showing the use of the present motor in a wheel in motor assembly.

In this regard and referring now to FIG. 15 there is shown the mounting of the present motor to a shaft that is used to orbit the motor and wheel assemblies as described in the aforementioned U.S. patents. The stator assembly 428 is secured to a bracket or steering knuckle 440 through suitable mounting means to secure the motor thereto. The steering knuckle mounted is disposed for orbiting motion or action in a well-known conventional manner and is powered through a linear actuator 442, as disclosed in the aforementioned U.S. patents.

Figure 16:
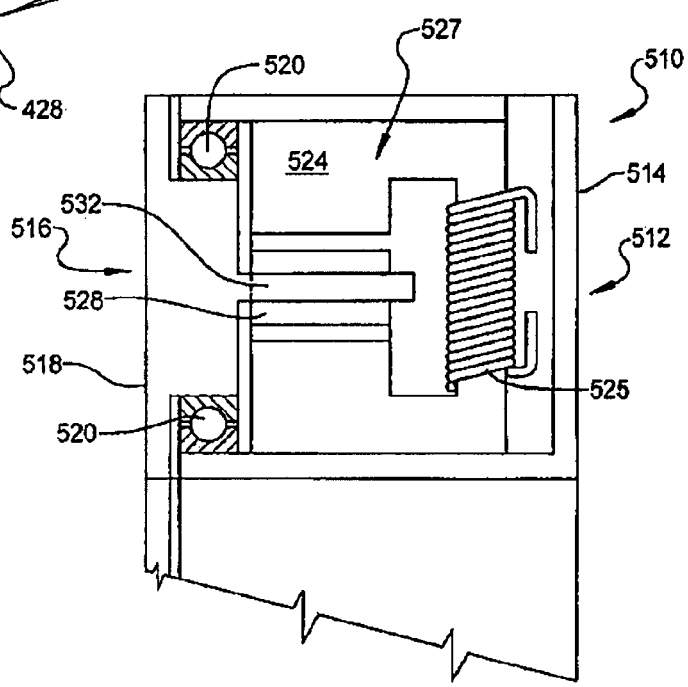
FIG. 16 is a cross-sectional view of a further embodiment hereof.
Figure 17:
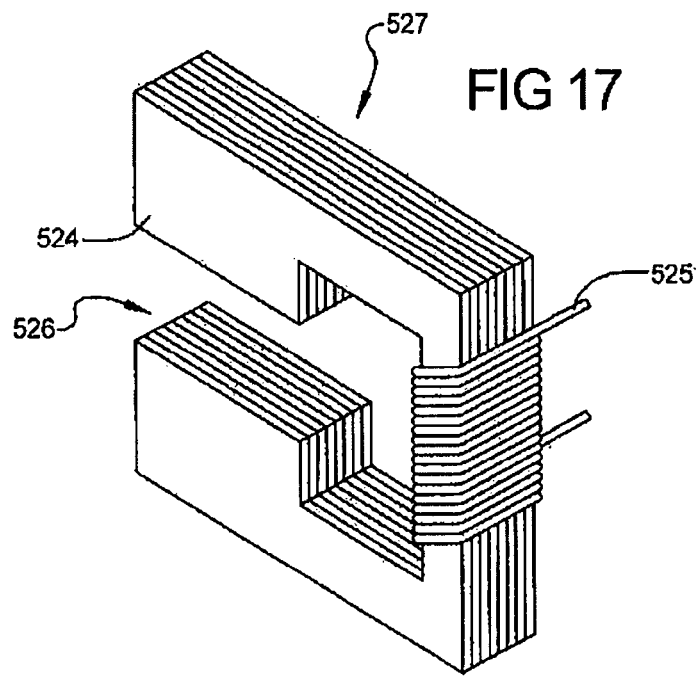
FIG. 17 is a perspective view of a stator coil module according to the embodiment of FIG. 16.
Figure 18:
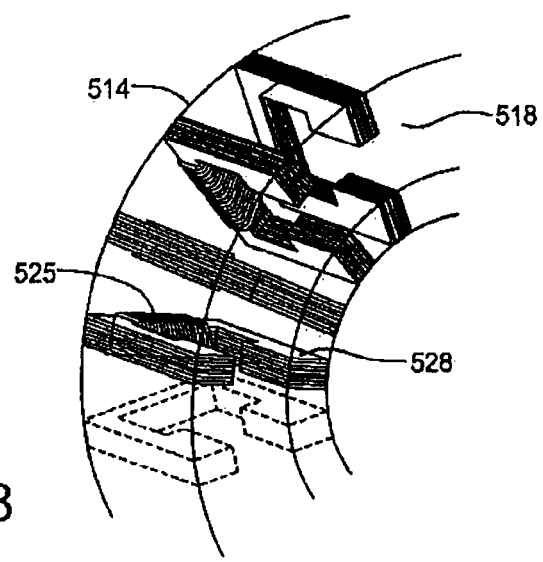
FIG. 18 is a partial perspective view showing the arrangement of the stator coil modules in accordance herewith.
Figure 19:
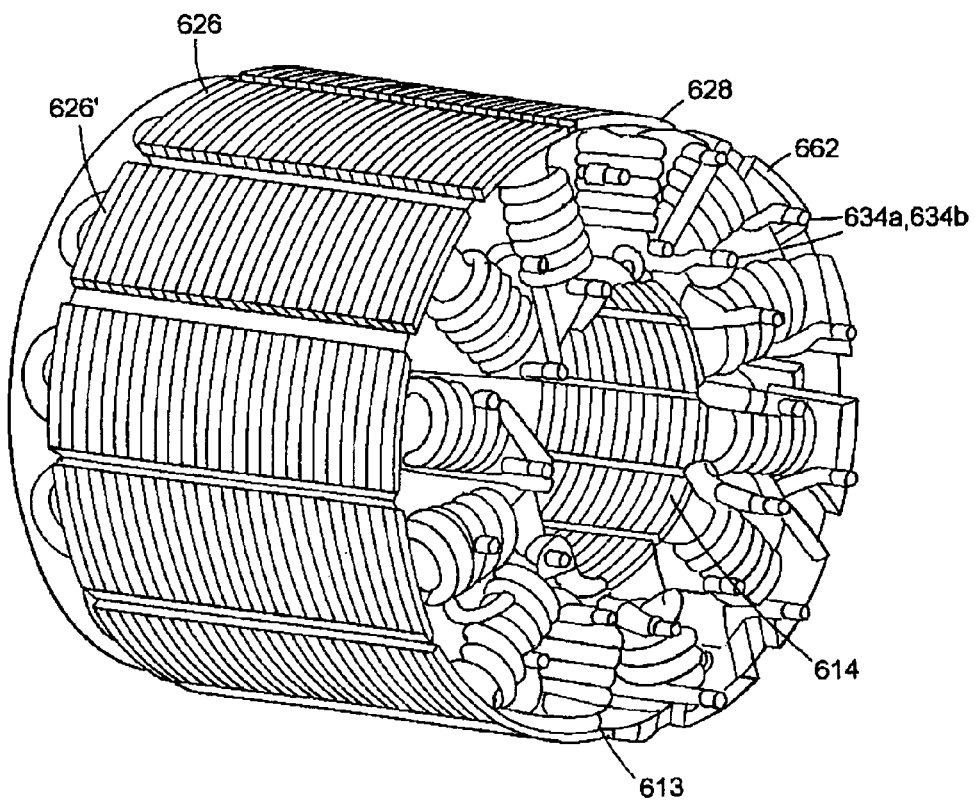
FIG. 19 is perspective view of a further embodiment of the motor/generator structure of the present invention, showing induction structure specifically the arrangement of the induction modules in accordance herewith.
Figure 24:
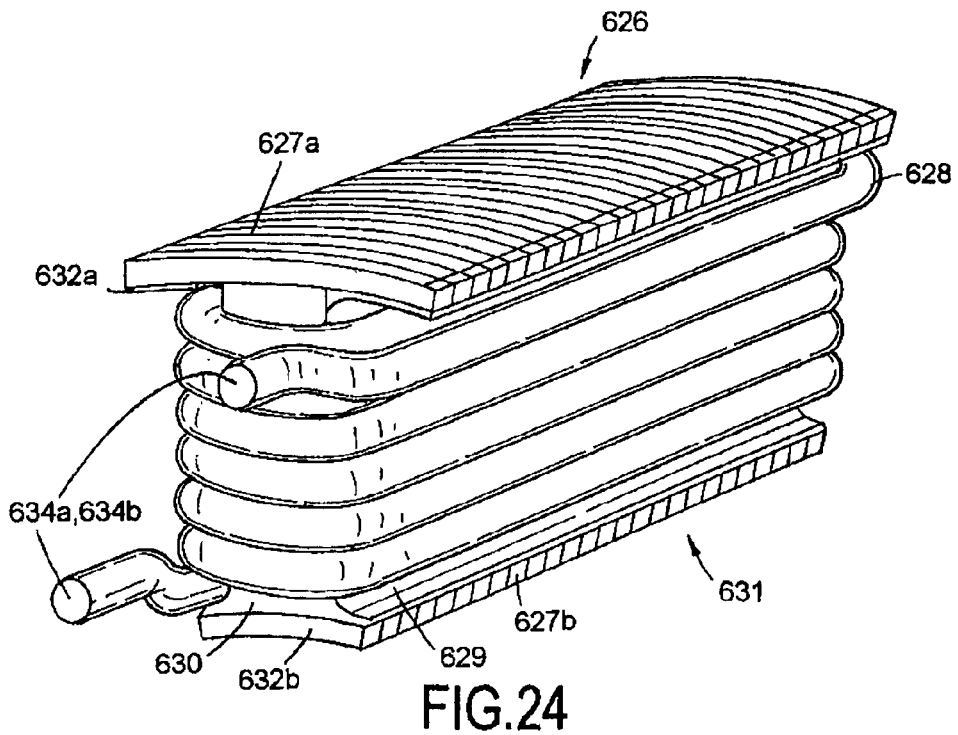
FIG. 24 is a perspective view of a further embodiment of the motor/generator structure of the present invention, showing a single induction module.
Figure 20:
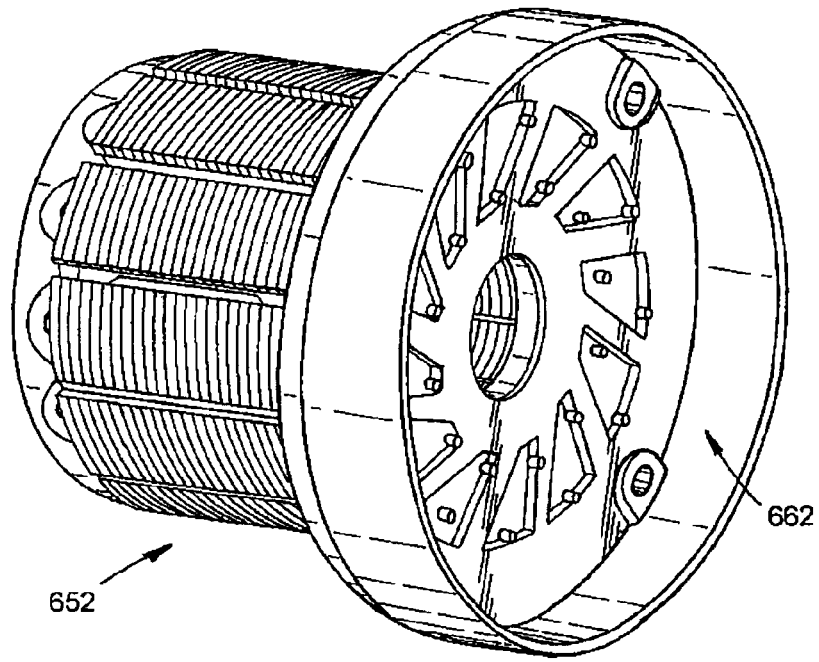
FIG. 20 is perspective view of a further embodiment of the motor/generator structure of the present invention, which includes a heat sink.
Figure 21A:
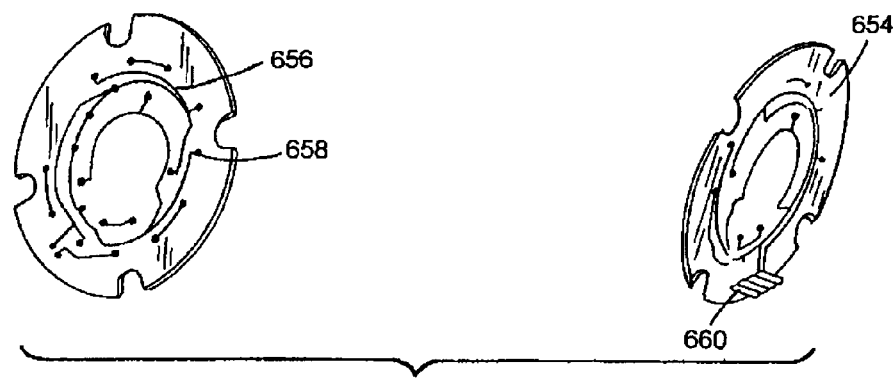
FIG. 21a is a perspective view of the printed circuit board of a further embodiment of the motor/generator structure of the present invention.
Figure 21B:
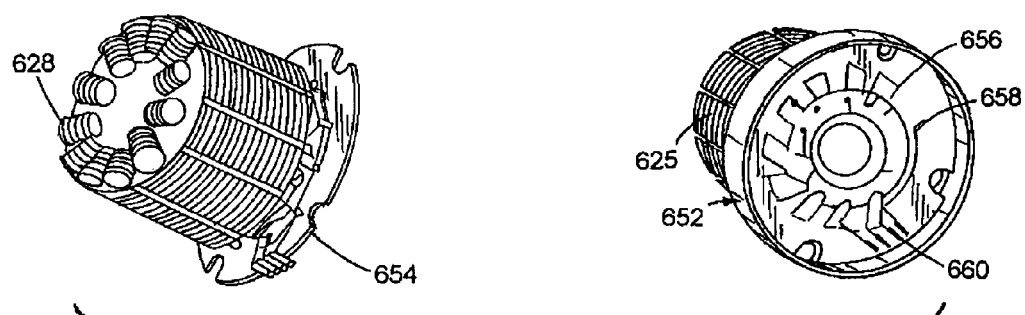
FIG. 21b is perspective view of a further embodiment of the motor/generator structure of the present invention, showing the induction structure attached to the printed circuit board.
Figure 22:
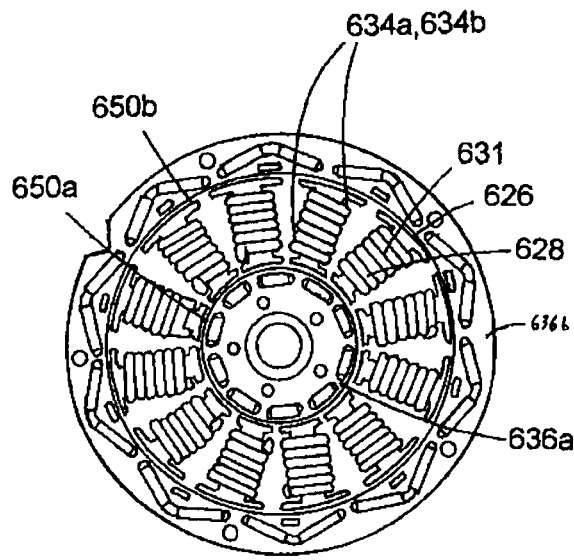
FIG. 22 is a cross-sectional view of a further embodiment of the motor/generator structure of the present invention.
Figure 23:
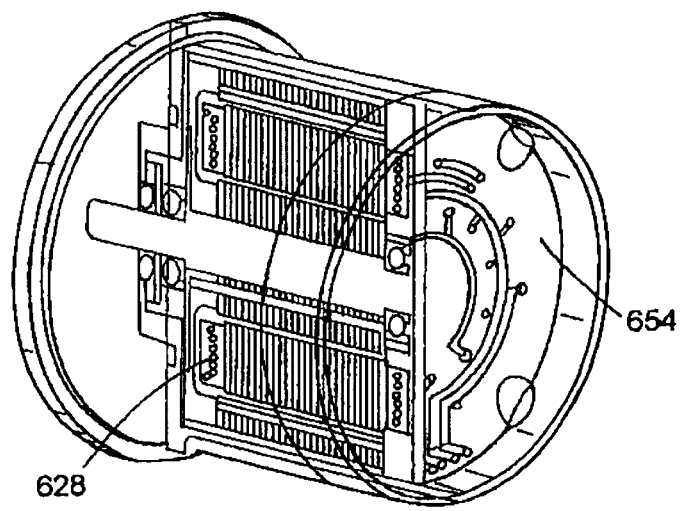
FIG. 23 is perspective view of a further embodiment of the motor/generator structure of the present invention.

Referring now to FIGS. 16-18 there is depicted therein a further embodiment of the present invention. According to this embodiment the electric motor/generator is of modular construction. As shown, the motor/generator, generally, denoted at 510 includes a stator 512 which comprises a shell or frame 514. A rotor 516 including a frame 518 is rotationally mounted to the stator in well know manner.

The rotor 516 is mounted for rotational movement about the stator by the use of bearings 520.

As shown, the stator 514 houses an induction structure 522 which, preferably, comprises a plurality of substantially C-shaped cores 524. Each core is fabricated, preferably, from iron or other suitable material. A plurality of windings, 525 similar to those described hereinabove, is disposed about the core and cooperates therewith to define as induction structure 527.

As a C-shaped structure, a gap 526 is provided between opposed ends or legs of the "C", as shown. Disposed within the gap or opening is a magnet 528. The magnet is mounted to the rotor via suitable means such as an annular ring 532 which is integrally formed with the frame 518 and projects laterally interiorly therefrom and into the interior of the "C" as shown.

The magnet 528 may be bonded to the shape 523 through the use of an epoxy or other suitable adhesive or other suitable means.

As shown in FIG. 18 each of the modules are equilaterally circumferentially disposed within the stator frame and are secured thereto through suitable mounting means via bolts or the like (not shown). When functioning as a motor, the rotor is driven via a driver (not shown) to cause the rotor 516 to rotate on the bearings 520. As a generator, as the magnets rotate, they create electricity at the induction structure which is drawn through the lead wires connected to the coil windings.

By being constructed in a modular manner the weight of the motor. Generation is greatly reduced along with concomitant reduction in cost.

It should be noted that the utilization of a dual radial gap enables an increase in magnetic flux density that is acted upon by the induced magnetic field created by passing current through the coils to produce the force that results in the rotational motion of the rotor. It is to be appreciated that a plurality of coil assemblies and magnets, i.e. two or more, can be used herein with plural gaps to further increase the magnetic flux density.

Although the present invention has been defined in terms of an automobile or other vehicle, it is to be noted that the present invention can be used with respect to rotationally powered devices such as wheelchairs, marine environments, aviation and, when employed as a generator, for power generation such as in windmills.

Depending on the application, the pipes and heat sinks 80 and the manifold 200 may be air cooled, and the cooling enhanced by provision of cooling fins.

In this fluid-cooling system, while not shown, a fluid pumping system is provided to pump cooling fluid in a circulatory manner to each of the cooling pipes and/or into the manifold to pump cooling fluid to each of the succession of cooling pipes. According to this aspect of the invention, the fluid path may comprise a closed loop and an open loop.

It should be noted, although not shown, that in some applications it may be possible to reduce the weight of the motor by eliminating the iron core and by having the coils wound around a spool with an air core fixed in position in an armature frame and subsequently attached to the stator frame.

Referring now to FIGS. 19-23 there is depicted a further embodiment of the present invention, which is a modification of the embodiment of FIGS. 16-18. According to this embodiment, the electric motor/generator is of modular construction.

As shown, the motor/generator, generally, denoted at 610, includes a stator 612, having a central axis C, a housing that comprises a cylindrical shell or frame 614, an inner circumferential surface 615 and an outer circumferential surface 613.

A rotor 616, including a frame 618, is rotationally mounted to the stator in well-known manner. The rotor 616 is mounted for rotational movement about the stator by the use of bearings 620.

As shown, the stator 614 houses an induction structure 622 of magnetically permeable material, juxtaposed the outer circumferential surface 613 of the stator 614.

The induction structure 622 comprises at least two independent induction modules 626, 626', etc. mounted in a radial array around and perpendicular to the central axis A of the stator 614 and a plurality of wire wound coil segments 628, 628'. While there can be a plurality of induction modules 626 and wire wound coil segments 628, each is of substantially the same construction, and therefore, for ease of description, only one such module 626 and one such wire wound coil segment 628 will be described. Preferably, each induction module 626 has a substantially "I" shaped core 631, the core 631 having a linear vertical portion 630 and two opposed radially arched horizontal flange portions 632a, 632b at each end 627a, 627b, which are connected by a central web 629. Each induction module 626, when energized, takes on the characteristics of a bar magnet having an opposite magnetic pole at each of the opposed linear horizontal portions 632a, 632b the polarity of which is determined by the direction of the current flowing through the wound coil wires 628. Each induction module 626 is fabricated, preferably, from a series of thin silicon steel segments (not shown individually), stacked together to form the desired core configuration. However, the induction modules 626 may also be made of any soft magnetic, including ferromagnetic material.

The "I-shaped" core 631 configuration of the induction module 626 supports the beneficial application of Grain Oriented Electrical Steel material, which exhibits an enhanced permeability in the direction of the steel roll (not shown). The enhanced direction would be aligned along the linear segment 630 of the "I-shaped" cores 631 of the induction modules 626 so as to increase the induced magnetic flux at the linear horizontal flange ends 627a, 627b.

Each of the wire wound coil segments 628, 628', etc. have two opposed ends 634a and 634b. Additionally, each wire wound coil segment 628, 628', etc. is wound around and disposed about its respective induction module 626. Preferably, the two opposed ends 634a, 634b project from the same side of the corresponding induction module 626 after winding.

The motor/generator 610 also includes at least two spaced apart annular rings 636a, 636b each having an inner surface 638 and an outer surface 640. The annular rings 636a, 636b have a permanent magnet structure 642 disposed between the inner surface 638 and the outer surface 640. This permanent magnet 642 structure comprises a plurality of spaced apart magnets 644, 644', etc. These permanent magnets 644 provide magnetic flux passively, The magnets 644 can either be bonded to the inner surface of the outer ring and to the inner surface of the inner ring or can be embedded within the annular rings 636a, 636b between the inner 638 and outer 640 circumferential surfaces and bonded in place with an epoxy or similar composition.

In lieu of bonding the magnets 644, 644', etc. within the annular rings 636a, 636b, the spaced apart annular rings 636a, 636b can have a plurality of slots 646, 646', etc. defined therein for receiving the magnets 644, 644', etc.

The plurality of slots 646, 646', etc. are formed within the annular rings 636a, 636b between the inner 638 and outer 640 surfaces for receiving the magnets 644 of the permanent magnet structure 642. This configuration, where the magnets 644, 644', etc., are embedded within the annular rings 636a, 636b provides a number of advantages including: a higher torque-to-volume ratio and a simplified manufacturing process.

Regardless of how the magnets 644 are disposed either on the inner and outer surfaces or within the annular rings 636a, 636b, the magnets 644 are to be placed with respective North and South poles adjacent to one another and disposed proximate the induction structure 625 in reversing polarities.

As shown, each of the induction modules 626 are equilaterally and circumferentially disposed within the stator frame 614 and are secured thereto through suitable mounting means such as bolts or the like (not shown). When functioning as a motor, the rotor 616 is driven via a driver (not shown) to cause the rotor 616 to rotate on the bearings 620. As a generator, as the magnets 644 rotate, they create electricity at the induction structure 625 which is drawn through the lead wires connected to the wound wire coil segments 628.

Further, the motor/stator core 612 is wound to individually energize the separate wire wound coil segments 628 in discrete coil segment zones or regions within the stator core 612, creating alternating and opposing magnetic states of the annular rings 636a, 636b and induction modules 626. These alternating and opposing magnetic states cause rotational motion, which is induced by commutation of the polarity of the wire wound coil segments 628 as the magnets 644 upon the annular rings 636a, 636b rotate past the coil segments 628.

The rotor 616 and stator 612 are mounted to one another for relative coaxial rotation about the central axis C by a means for mounting 648. The rotor 616 and stator 612 are mounted in such a manner that there is at least two spaced apart radial gaps 650a, 650b. The first gap 650a is provided between the first annular ring 636a and the induction structure 625 and the second gap 650b is provided between the second annular ring 636b and the induction structure 625, with the stator 612 being disposed between the two radial gaps 650a, 650b.

It should be noted that the utilization of at least dual radial gaps enables an increase in magnetic flux density that is acted upon by the induced magnetic field created by passing current through the coils 628 to produce the force that results in the rotational motion of the rotor 616. It is to be appreciated that a plurality of coil assemblies 628 and magnets 644, i.e. two or more, can be used herein with plural gaps to further increase the magnetic flux density.

The components of the electric motor/generator 610 can optionally include a heat sink 652 used to thermally link the heat producing stator elements to the ambient environment. Additionally, the induction modules 626, wound wire coil segments 628, and heat sink 652 are secured in position relative to one another with a polymer over-mold 662 of thermally conductive material. A thermally conductive, electrically insulating polymer is injected into the polymer over-mold to fully encapsulate and bond together all of the loose stator components 626, 628, 652.

The wire wound coil segments 628 of electric motor/generator 610 are also capable of being electrically interconnected through a connector board 654. The connector board 654 can be either a single or double sided printed circuit board, having tracks 656 and track termination holes 658. In such an embodiment, the track termination holes correspond with the position of the opposed ends 634a, 634b of the wire wound coil segments 628. The opposed ends 634a, 634b of the wire wound coil segments 628 fittedly attach to the printed circuit board 654 at the track termination holes 658 at each end of the track 656. The ends 634a, 634b of the wire wound coil segments 628 are the soldered or otherwise electrically bonded to the track termination holes 658, providing a completed electrical circuit. The completed electrical circuit ends at a plurality of terminal pins 660 that are provided to receive and connect to an electronic motor controller or other mechanical mechanism (not shown) to facilitate commutation and used to control the direction and speed of the motor/generator 610.

By being constructed in a modular manner the weight of the motor/generator is greatly reduced along with concomitant reduction in cost. By embedding the permanent magnet structure 642 within the annular rings 636a, 636b rather than mounting the permanent magnet structure 642 to the outer surface 640 of the annular rings 636a, 636b, an overall reduction in dimension is possible, while delivering a higher power density than that of a conventional electric motor/generator.

While the printed circuit board 654 is preferred means for electrically interconnecting the opposed ends 634a, 634b of the wire wound coil segments 628. The printed circuit board 654 provides for a unique, compact, low profile solution which maintains the reduced size paramount to this embodiment. Using a printed circuit board 654 to connect the coils, also, motor/generator 610 design flexibility, as the coil connection configuration printed on the circuit board 654 establishes the motor phase (one phase, three phases, . . . etc.) as well as the motor type (synchronous, stepper, . . . etc.). Therefore, the motor phase and type can be changed by simply exchanging one circuit board for another with a different track 656 configuration without modification to any other motor component.

This embodiment, thereby also allows for the application of high volume, cost effective, manufacturing processes that assure the necessary accuracy and consistency in assembly of the various components.

Such accuracy and consistency in manufacture is paramount in an electric motor/generator of reduced dimension. As the motor/generator's critical dimensions are reduced, the components also reduce in size. Notably, the size and accuracy of the radial air gaps must be necessarily reduced and tolerances reduced to minimize flux losses. Additionally, the tolerances of all other moving and motion related elements must also be more accurate to avoid a major negative effect on operational performance and motor life.

Utilizing the developments in the field of permanent magnets, developments made in the field of direct current electric motors, and generators, this further embodiment provides for a more compact, higher power, higher torque, and higher efficiency design. Performance enhancements are possible through the development of high magnetic flux density, rare earth permanent magnets along with high density wire wound coil segments, and thermal management techniques. This embodiment, through unique design and manufacturing techniques, provides a resulting apparatus with an inherently higher torque density provided by the embedded magnet system, which results from multiple torque components, namely reactive and reluctance torque. Because a rotor with embedded magnets (in most cases) produces a higher torque than a similar rotor fitted with surface mounted magnets. An embedded magnet rotor system produces two torque force components, i.e., a reactive torque component, as does a surface mounted magnet rotor system, plus a reluctance torque component that results from the stator coil field attraction to the mass of the ferromagnetic material residing between the imbedded magnet poles. The two torque components are additive resulting in a higher torque than occasioned with a surface mounted rotor configuration. The device is designed to minimize cogging and torque ripple and provide uniform back EMF.

While the present invention has been described in terms more or less specific to preferred embodiments, it is expected that various alterations, modifications, or permutations thereof will be readily apparent to those skilled in the art. For example, the invention may be embodied in an electrical generator as well as a motor. As a generator, and as shown in FIG. 13 it is possible that the number of windings around each of the core segments may vary. For example, there may be X number of windings around one coil segment and Y number of windings around another coil segment each connected to its own electric circuit. In such an arrangement a first group of windings is wound around the outboard pole of the core which a second group of windings is wound around the inboard pole. Although the number of wire turns within each individual grouping is identical, the coil groupings differ in the number of wire turns within the individual coils in the first grouping are different than those in the second. The two individual groupings of coils produce two separate distinct voltages, when the generator rotor is rotated relative to the stator. The difference between the two voltages unique to each of the separate circuits is a function of the difference between the numbers of wire turns wound within the individual coils in each grouping. The grouping with the greater number of turns within its coils will produce a current at a higher voltage than the grouping with the lower number turns. In this manner, various voltages may be drawn off from the device when functioning as a generator.

Although the present invention has been defined in terms of an automobile or other vehicle, it is to be noted that the present invention can be used with respect to rotationally powered devices such as wheelchairs, marine environments, aviation and, when employed as a generator, for power generation such as in windmills. Therefore, it should be understood that the invention is not to be limited to the specific features shown or described, but it is intended that all equivalents be embraced within the spirit and scope of the invention as defined by the appended claims.

The invention claimed is:

1. A brushless electric motor/generator comprising:
 a) a stator having a central axis, an inner circumferential surface, and an outer circumferential surface,
 b) an induction structure of magnetically permeable material, juxtaposed the outer circumferential surface of the stator, the induction structure comprising at least two independent induction modules mounted in a radial array around and perpendicular to the central axis of the stator, each induction module having at least one wire wound coil segment, the at least one wire wound coil segment having two opposed ends and the at least one wire wound coil segment being wound around its respective induction module,
 c) a rotor having an inner surface,
 d) at least two spaced apart annular rings each having an inner surface and outer surface, the annular rings having a permanent magnet structure comprising a plurality of circumferentially spaced apart magnets, the magnets being disposed between the inner surface and outer surface of the annular rings, the respective North and South poles of the magnets placed adjacent one another and disposed proximate the induction structure in reversing polarities.
 e) means for mounting the rotor and stator to one another for relative coaxial rotation about the central axis and in a manner such that there is at least two spaced apart radial gaps, the first gap between the first annular ring and the induction structure and the second gap between the second annular ring and the induction structure, the stator being disposed between the gaps,
 f) a heat sink disposed about and encircling one end of induction structure,
 g) a polymer over mold of thermally conductive material, and wherein the polymer over mold secures the at least two induction modules, corresponding wire wound segments, and the heat sink in relative position, the polymer defining a thermal link from the wound segments to the heat sink.

2. The brushless electric DC motor/generator of claim 1 wherein the plurality of circumferentially spaced apart magnets forming the permanent magnet structure are embedded within at least one annular ring.

3. The brushless electric DC motor/generator of claim 1 wherein at least one of the annular rings have a plurality of slots formed between their respective inner surface and outer surface, one of the plurality of circumferentially spaced apart magnets of the permanent magnet structure being disposed and fittedly secured within an associated one of the plurality of slots.

4. The brushless electric DC motor/generator of claim 1 wherein the at least two induction modules are substantially "I" shaped having a linear vertical portion and two opposed linear horizontal portions.

5. The brushless electric DC motor/generator of claim 1 wherein the at least one wire wound coil segment is generally linear in shape, the at least one wire wound coil segment having its linear length dimension disposed axially, forming overlapping portions which form a succession of angularly separated axial recesses.

6. The brushless electric DC motor/generator of claim 1 wherein the motor/generator is a motor having a cavity provided in the housing, the motor further comprising an electronic drive/controller, the drive/controller being disposed in the cavity.

7. The brushless electric DC motor of claim 6 wherein the cavity is lined with a thermally insulating material to thermally isolate and protect the electronic components.

8. The brushless electric DC motor/generator of claim 1 wherein the opposed ends of the at least one wire wound coil segments project from the same side of the corresponding induction module after winding.

9. The brushless electric DC motor/generator of claim 1 further comprising: a printed circuit board having tracks and track termination holes, wherein the opposed ends of the at least one wire wound coil segment project from the same side of the corresponding induction module after winding, and further wherein the opposed ends of the at least one wire wound coil segment fittedly attach to the printed circuit board at the track termination holes.

10. The brushless electric DC motor of claim 1 further comprising a modifiable printed circuit board, the board having tracks and track termination holes, the tracks being modifiable to determine the motor phase and type based upon the connection pattern established by the track layout and connection sequence between each of the individual coils within the coil array.

11. The brushless electric DC motor/generator of claim 1 wherein the at least two induction modules are substantially "I" shaped, each having a linear vertical portion and two opposed linear horizontal portions, and wherein the at least one wire wound coil segment is of a grain oriented electrical steel, with the grain of the steel being orientated along the line of the linear vertical portion of each induction module.

12. The brushless electric DC motor/generator of claim 1 wherein the inner surface of the rotor is a cylindrical inner surface.

* * * * *